US008701198B2

(12) United States Patent
Greene et al.

(10) Patent No.: US 8,701,198 B2
(45) Date of Patent: Apr. 15, 2014

(54) PERFORMING SECURITY ANALYSIS ON A SOFTWARE APPLICATION

(75) Inventors: Collin Greene, San Francisco, CA (US); Robert Fly, Moraga, CA (US); Varun Badhwar, Pleasantton, CA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

(21) Appl. No.: 12/854,106

(22) Filed: Aug. 10, 2010

(65) Prior Publication Data

US 2012/0042384 A1 Feb. 16, 2012

(51) Int. Cl.
*G06F 21/00* (2013.01)

(52) U.S. Cl.
USPC ............................ 726/25; 726/30; 717/126

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |

(Continued)

OTHER PUBLICATIONS

Non-Final Office Action for U.S. Appl. No. 12/854,102, mailed Sep. 18, 2012.

(Continued)

*Primary Examiner* — Michael R Vaughan
(74) *Attorney, Agent, or Firm* — Ingrassia Fisher & Lorenz, P.C.

(57) ABSTRACT

A system and method for performing security analysis on a software application. In one embodiment, a method includes receiving application architecture information for a software application; and determining an application type based on the application architecture information. The method also includes performing one or more security tests on the software application based on the application type and the application architecture information; and approving the software application to be available in an online marketplace if the software application passes the one or more security tests.

17 Claims, 4 Drawing Sheets

(56) References Cited

U.S. PATENT DOCUMENTS

| | | | |
|---|---|---|---|
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,766,481 B2 * | 7/2004 | Estep et al. | 717/124 |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,296,197 B2 * | 11/2007 | Pushpavanam et al. | 714/722 |
| 7,330,967 B1 * | 2/2008 | Pujare et al. | 713/2 |
| 7,340,411 B2 | 3/2008 | Cook | |
| 7,389,216 B2 * | 6/2008 | Parent et al. | 703/21 |
| 7,480,900 B1 * | 1/2009 | Zhou et al. | 717/132 |
| 7,552,480 B1 * | 6/2009 | Voss | 726/25 |
| 7,620,655 B2 | 11/2009 | Larsson et al. | |
| 7,698,160 B2 | 4/2010 | Beaven et al. | |
| 7,802,089 B2 * | 9/2010 | Snover et al. | 713/152 |
| 7,962,788 B2 * | 6/2011 | Manglik et al. | 714/25 |
| 8,024,807 B2 * | 9/2011 | Hall et al. | 726/25 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,176,560 B2 * | 5/2012 | Jin et al. | 726/25 |
| 8,275,836 B2 | 9/2012 | Beaven et al. | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0006704 A1 * | 1/2004 | Dahlstrom et al. | 713/200 |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0144226 A1 * | 6/2005 | Purewal | 709/203 |
| 2005/0166094 A1 * | 7/2005 | Blackwell et al. | 714/38 |
| 2005/0273859 A1 * | 12/2005 | Chess et al. | 726/25 |
| 2006/0026519 A1 * | 2/2006 | Vaindiner et al. | 715/700 |
| 2006/0064570 A1 * | 3/2006 | di Savoia | 712/227 |
| 2006/0085852 A1 | 4/2006 | Sima | |
| 2006/0168564 A1 * | 7/2006 | Zhang et al. | 717/121 |
| 2008/0163372 A1 | 7/2008 | Wang | |
| 2008/0209567 A1 * | 8/2008 | Lockhart et al. | 726/25 |
| 2009/0049553 A1 * | 2/2009 | Vasudeva | 726/25 |
| 2009/0055804 A1 * | 2/2009 | Blaschek et al. | 717/126 |
| 2010/0146486 A1 * | 6/2010 | Mehta et al. | 717/126 |
| 2010/0180260 A1 * | 7/2010 | Chikkadevaiah et al. | 717/125 |
| 2010/0281248 A1 * | 11/2010 | Lockhart et al. | 713/150 |
| 2011/0185231 A1 * | 7/2011 | Balestrieri et al. | 714/27 |
| 2011/0246504 A1 * | 10/2011 | Slater et al. | 707/769 |
| 2012/0042383 A1 * | 2/2012 | Greene et al. | 726/25 |
| 2012/0054871 A1 * | 3/2012 | Soby et al. | 726/25 |
| 2012/0072968 A1 * | 3/2012 | Wysopal et al. | 726/1 |

OTHER PUBLICATIONS

USPTO, Final Office Action for U.S. Appl. No. 12/854,102, mailed Mar. 14, 2013.

* cited by examiner

PERFORMING SECURITY ANALYSIS ON A SOFTWARE APPLICATION

CROSS REFERENCE TO RELATED APPLICATIONS

The following commonly owned, Patent Application, including the present application, are related to each other. The other application is incorporated by reference herein in its entirety: U.S. patent application Ser. No. 12/854,102 entitled "Adapting a Security Tool for Performing Security Analysis on a Software Application," filed Aug. 10, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to software applications used in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

A large number of organizations promote third-party ecosystems (e.g., Apple AppStore, Google Apps Marketplace, Salesforce.com AppExchange, SugarCRM SugarExchange, etc.) to expand product/service offerings, increase customer adoption and experience organic growth. Unfortunately, since these third-party products integrate closely with the organizations' core products and have access to customer data, a security vulnerability in these applications could cause catastrophic damage (e.g., financial, regulatory and reputational) to the promoting organization. The growth of online stores for software applications has further increased the risk to businesses and consumers. Many online marketplaces perform only random security checks or avoid the responsibility of security analysis completely.

BRIEF SUMMARY

Embodiments provide mechanisms and methods for performing security analysis on a software application. In one embodiment, a method includes receiving application architecture information for a software application; determining an application type based on the application architecture information. The method also includes performing one or more security tests on the code based on the application type and the application architecture information; and approving the software application to be available in an online marketplace if the code passes the one or more security tests.

While embodiments of the present invention may be implemented in a system having an application server providing a front end for an on-demand database service capable of supporting multiple tenants, the present invention is not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for performing security analysis on a software application.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for performing security analysis on a software application will be described with reference to example embodiments.

System Overview

Figure 1:
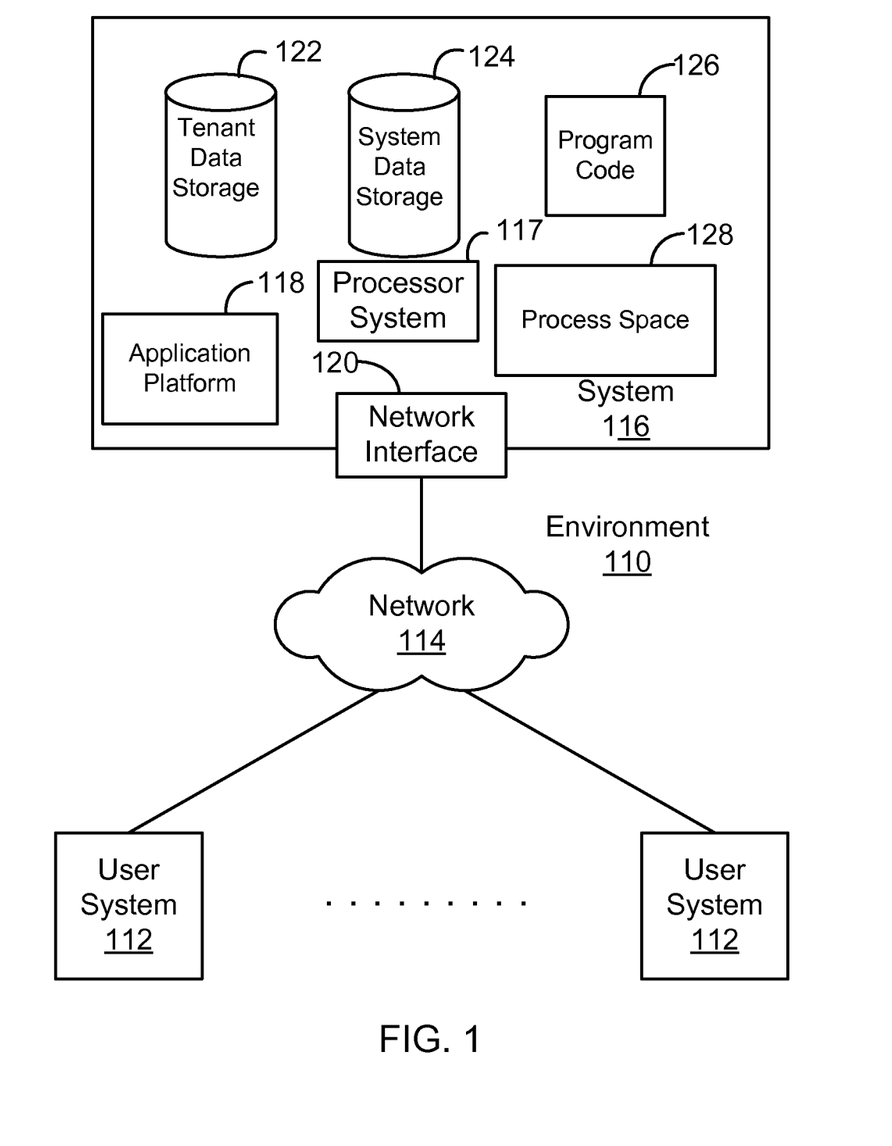
FIG. 1 illustrates a block diagram of an example environment wherein a database service might be used, and which may be used to implement the embodiments described herein.

FIG. 1 illustrates a block diagram of an example environment 110 wherein a database service might be used, and which may be used to implement embodiments described herein. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creating, managing, and executing one or more applications developed by either the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112. In addition, system 116 includes application servers configured to store to, and retrieve from, a database system related data, objects, and Webpage content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
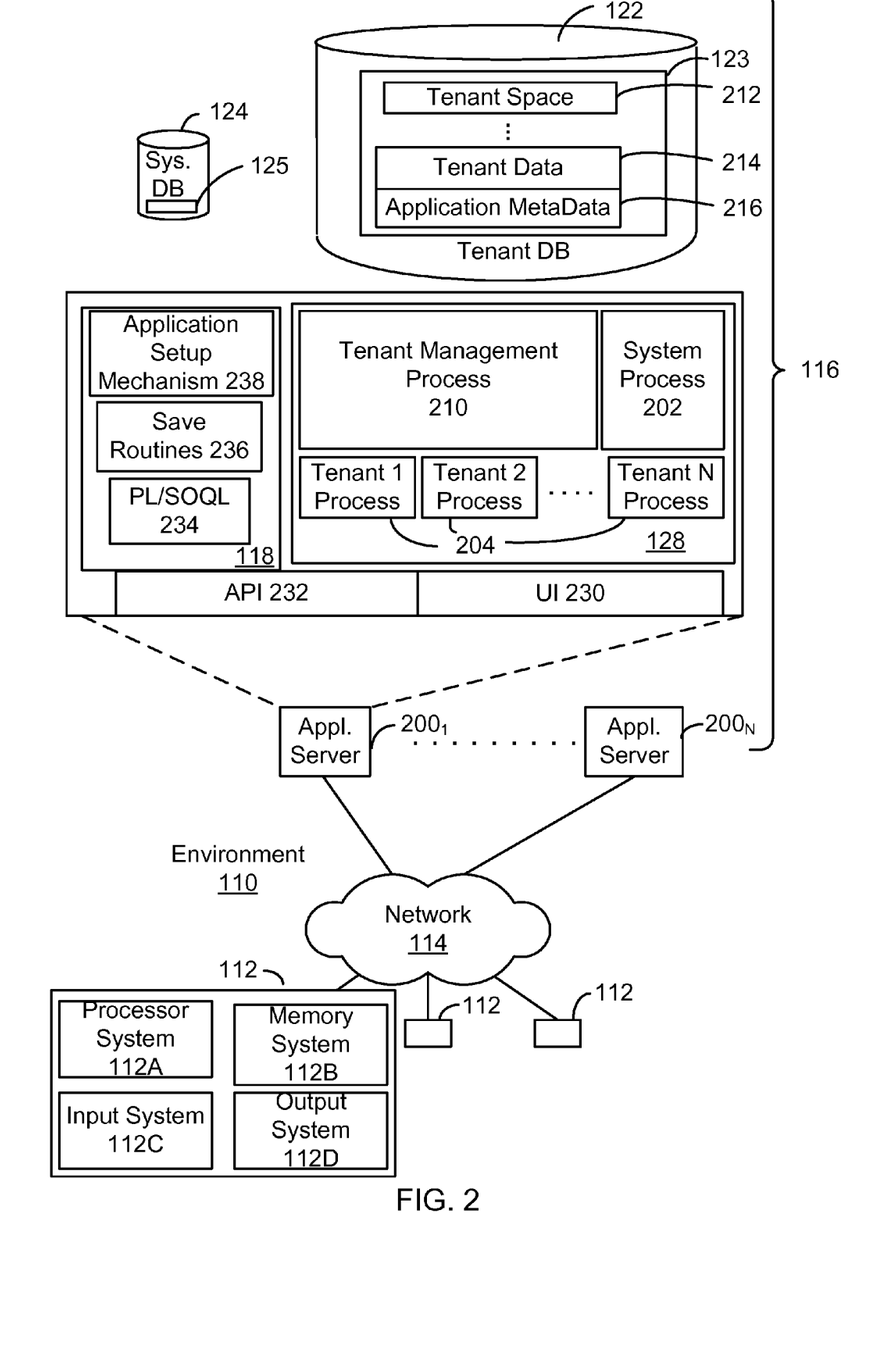
FIG. 2 illustrates a block diagram of another example environment 110, which may be used to implement the embodiments described herein.

FIG. 2 also illustrates environment 110, which may be used to implement embodiments described herein. FIG. 2 also illustrates elements of system 116 and various interconnections, according to one embodiment. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, user interface (UI) 230, application program interface (API) 232, PL/Salesforce.com object query language (PL/SOQL) 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown in FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes and to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210, for example. Invocations to such applications may be coded using PL/SOQL 234 that provides a programming language style interface extension to API 232. Invocations to applications may be detected by one or more system processes, which manage retrieving application metadata 216 for the subscriber, making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer control protocol and Internet protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles the storage of, and access to, different objects, data and applications across disparate users and organizations.

As an example of storage, one tenant might be a company that employs a sales force where each salesperson uses system 116 to manage his or her sales process. Thus, a user might maintain contact data, leads data, customer follow-up data, performance data, goals and progress data, etc., all applicable to that user's personal sales process (e.g., in tenant data storage 122). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 700 in system 116) automatically generates one or more structured query language (SQL) statements (e.g., one or more SQL queries) that are designed to access the desired information. System data storage 124 may generate query plans to access the requested data from the database.

Figure 3:
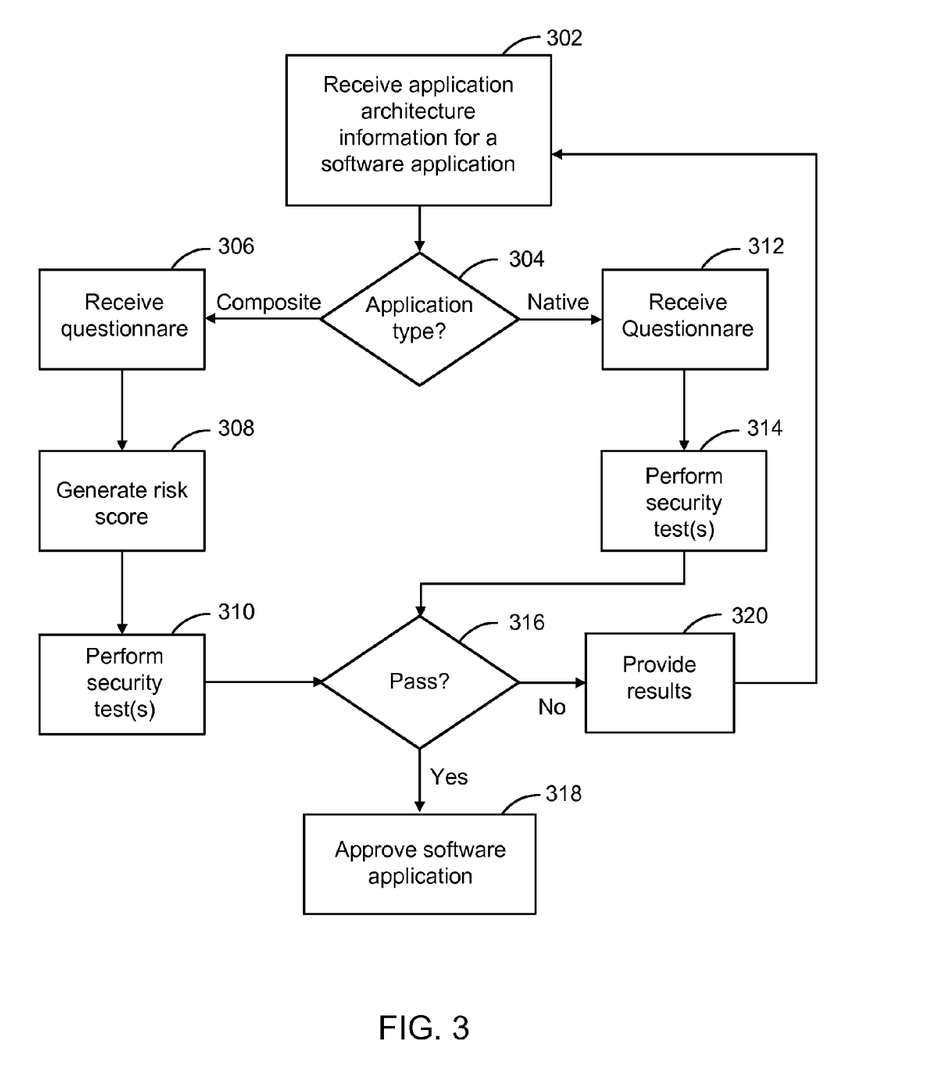
FIG. 3 illustrates an example simplified flow diagram for performing security analysis on a software application.

Embodiments describe below with respect to FIG. 3 provide automatic security analysis during a submission process of a software application to an online marketplace, or during an update process of an existing software application on an online marketplace.

FIG. 3 shows is an example simplified flow diagram for performing security analysis on a software application. Referring to both FIGS. 2 and 3, the method is initiated in block 302, where system 116 receives application architecture information for a software application from a user. In one embodiment, system 116 also receives the code for the software application along with the application architecture information. In one embodiment, the software application may be implemented entirely or partially in system 116 and made available in an online marketplace. In one embodiment, the user may also be referred to as a developer or more generally as a third-party user. In one embodiment, the user may be an integrated systems vendor (ISV). While system 116 is described as performing the steps as described in the embodiments herein, any suitable component or combination of components of system 116 or any worker machine or combination of worker machines may perform the steps described. For example, the steps may be performed by processor system 117 or process space 128 of FIG. 1, by system process 202 of FIG. 2, or by any other suitable processor or processors associated with system 116. Note that the terms "software code" and "code" are used interchangeably. Also, references to the code (the testing of or otherwise) implies references to some or all components that constitutes a software application. For example, references to tests performed on the code implies tests performed on the software application in whole or in part depending on the code or software components being tested.

Before system 116 receives the code for the software application, the code is first bundled into a format suitable for upload to system 116 and suitable for listing on an online marketplace. The format can be a compressed bundle (ZIP, gzip, etc), an executable, an install script, or a marketplace specific packaging format. The application developer then uses the marketplace's upload software or utility to begin the upload and listing process for the software application.

Before the software application is directly listed in the marketplace, system 116 queues the software application in a repository for security analysis by automated tools. The repository may consist of a database, file system, or distributed data store. For example, system database 124 (FIG. 2) may be used to implement the repository. In one embodiment, a queue of applications to be analyzed is monitored in real-time, and security analysis is performed on each queued application by a cluster of automated analysis tools as system resources become available.

In one embodiment, system 116 also receives identifying information associated with the code and more generally to the software application. The identifying information may be a part of the application architecture information and may include, for example, a company name, a name of the user, etc.

In block 304, system 116 determines an application type based on the application architecture information. In one embodiment, software application types may be of two categories, where one category may be referred to as native applications and the other category may be referred to as composite applications. Additional categories are possible.

In one embodiment, native applications are applications that are completely developed and hosted on system 116 with no external integrations, except to approve third parties (e.g., Amazon, Facebook, Twitter, Google, etc.). Even if native applications are internal to system 116, their software code may still contain security vulnerabilities.

In one embodiment, composite applications are applications that are developed outside the system 116 platform, and are integrated with system 116 platform via an API. In one embodiment, data used by composite applications may reside outside of system 116. Also, composite applications may use some stub code on system 116, where most of the work is performed on third-party servers via the Internet. Because of this, in one embodiment, additional controls such as network security, physical security, etc. are tested by system 116.

As shown in FIG. 3, blocks 306, 308, and 310 pertain to composite applications. Blocks 312 and 314 pertain to native applications. Blocks 316, 318, and 320 pertain to both composite and native applications.

In block 306, system 116 receives a questionnaire associated with the received code if the application type is a composite application. In one embodiment, the questionnaire may be included with the application architecture information as a part of the application architecture information. In one embodiment, system 116 may generate and send the questionnaire to the user online or via email and resumes with the process of FIG. 3 after receiving the completed questionnaire. The user may complete and submit the questionnaire online, via email, or any other suitable means (e.g., Word document, etc.). In one embodiment, a completed questionnaire contains what the user has done regarding security, and what the user may know about security vulnerabilities. Such security vulnerabilities known to the user may include, for example, a lack of a firewall, a lack of security procedures and/or protocols (e.g., policies on who is permitted to access a server running the software application), a lack of an intrusion detection system, etc. In one embodiment, if the questionnaire already exists in system 116 (e.g., from a prior submission), system 116 retrieves the questionnaire from a storage location such as system database 124 (FIG. 2).

In one embodiment, the questionnaire informs system 116 of what needs to be done to minimize or eliminate security vulnerabilities, which security tools to run to detect security vulnerabilities, and how system 116 and/or administrators of system 116 may help the user to minimize or eliminate security vulnerabilities.

In block 308, system 116 generates a risk score based on the questionnaire. In one embodiment, the questionnaire has dependencies based on how questions are being answered. For example, in one embodiment, a geographical location (e.g., country) or a physical location (e.g., house) of the server running the software application may trigger follow-up questions. For example, some countries may lack laws protecting privacy. A questionnaire indicating a particular geographical location, physical location, or other attribute may trigger follow-up questions to better understand potential security vulnerabilities. In one embodiment, system 116 generates the risk score based on a pre-defined risk scoring methodology. For example, system 116 may give a weight value to each question of the questionnaire. Each question may be weighted based on a relative importance, or, more particularly, relative risk factors. For example, a question about location may have a high weight value. In one embodiment, a given question may have a high weight value while being dependent on another question that has a low-weight value. For example, whether a given network used by a server running a software application is a wireless network may be of less importance than whether encryption is used with the wireless network. Accordingly, a question about the type of network may have a low weight value, while a related question about the wireless network being encrypted or not may have a high weight value.

In block 310, system 116 performs one or more security tests on the code of the software application based on the risk score. In one embodiment, in addition to the risk score, system 116 may perform one or more security tests on the code of the software application based on the application architecture information. In one embodiment, system 116 may require hands-on security test or may require hand-run security tools. In one embodiment, for code written on system 116, a custom connector downloads all the Apex and Visualforce code and runs a static source code analysis tool to identify security vulnerabilities. In one embodiment, system 116 may utilized a variety of security tools to perform security tests. Such security tools are described in more detail below with respect to FIG. 4.

In block 312, system 116 receives a questionnaire associated with the received code if the application type is a native application. As indicated above, in one embodiment, the questionnaire may be included with the application architecture information as a part of the application architecture information. In one embodiment, system 116 may generate and send the questionnaire to the user online or via email and resumes with the process of FIG. 3 after receiving the completed questionnaire. In block 314, system 116 performs one or more security tests on the code of the software application. In one embodiment, system 116 may perform one or more security tests on the code of the software application based on the application architecture information. In one embodiment, the one or more security tests include running a source code scanner on the code. In block 316, system 116 determines if the software code passed the one or more tests (block 310 or block 320).

In block 318, system 116 approves the software application to be available on the online marketplace (e.g., AppExchange) if the code of the software application passes the one or more security tests. In one embodiment, for each application, the analysis tools generate a report for any security vulnerabilities identified in the application. System 116 may notify the user via any suitable means (e.g., online, email, etc.).

In one embodiment, if a given application is approved, the application is also categorized into a low, medium or high risk-ranking. The ranking may be determined by a number of characteristics, some of which include: whether sensitive data is stored on servers outside of the system platform; how authentication is managed; a worse-case scenario if the third-party application is compromised; a number of customers using the application; and security awareness of the application developer(s), etc.

In block 320, if the software code fails the one or more security tests, system 116 provides results to the user via any suitable means (e.g., online, email, etc.). In one embodiment, the code fails a security test if the security test identifies one or more security vulnerabilities. The user would then be required to address the security vulnerabilities (e.g., by modifying the code to address the security vulnerabilities). In one embodiment, the user may be required to address the security vulnerabilities within a predefined time period (e.g., within 30 days). In one embodiment, the notification includes information about the one or test failures so that the user may modify the software code as needed in order to pass the one or more tests.

If vulnerabilities are found, the total risk posed by the vulnerabilities is compared against the marketplace's risk for the target package. Acceptable risk levels can be based on the target consumer of the software, the access given to the software, the type of environment into which the software can be installed, or other factors. If the total vulnerability risk exceeds the marketplace's tolerance for the package's risk, the upload or update process is automatically cancelled, and the user is notified that the upload process failed. In one embodiment, the report is delivered to the user through the upload utility or another mechanism such as email. Alternatively, the marketplace can decide to allow the package to be uploaded or updated but send the generated report to the developer along with a notice that issues must be resolved in a pre-determined time period. If a package is not remedied within the specified timeline, the package is removed from the marketplace.

In one embodiment, before sending a notification to the user, system 116 ensures that the user is authorized to receive the notification, because the notification itself may be a security vulnerability. In one embodiment, system 116 may look up the user, all information associated with the user (e.g., the user's role as administrator, normal user, etc.).

In one embodiment, the security review process described above may be used for subsequent application updates. For example, if a user updates/upgrades and uploads an application, and the application is associated with an existing online marketplace listing, an automated source code scan is triggered, and the process above is performed for the update/upgrade.

In one embodiment, system may perform recurring reviews on previously approved applications in order to ensure high security standards. In one embodiment, the recurring reviews may be based on the risk ranking of the application during its previous review. In one embodiment, such recurring reviews may occur at a predefined time period. For example, the frequency may be once every 6 months for high-risk applications to once every 2 years for low-risk applications, etc. In one embodiment, a risk-ranking matrix may be used to determine periodic review frequency. In one embodiment, the process for recurring reviews is essentially the same as the process for a new application, as described above. If the application fails, the user may be required to address security vulnerability issues and re-submit the application for another review. In one embodiment, the user may be required to address any security vulnerability issues within a predefined time period (e.g., 30 days, 60 days, etc.). Failure to comply may result in removal of the application from being publicly available on the online marketplace. In one embodiment, recurring reviews may be required for all third-party applications.

Figure 4:
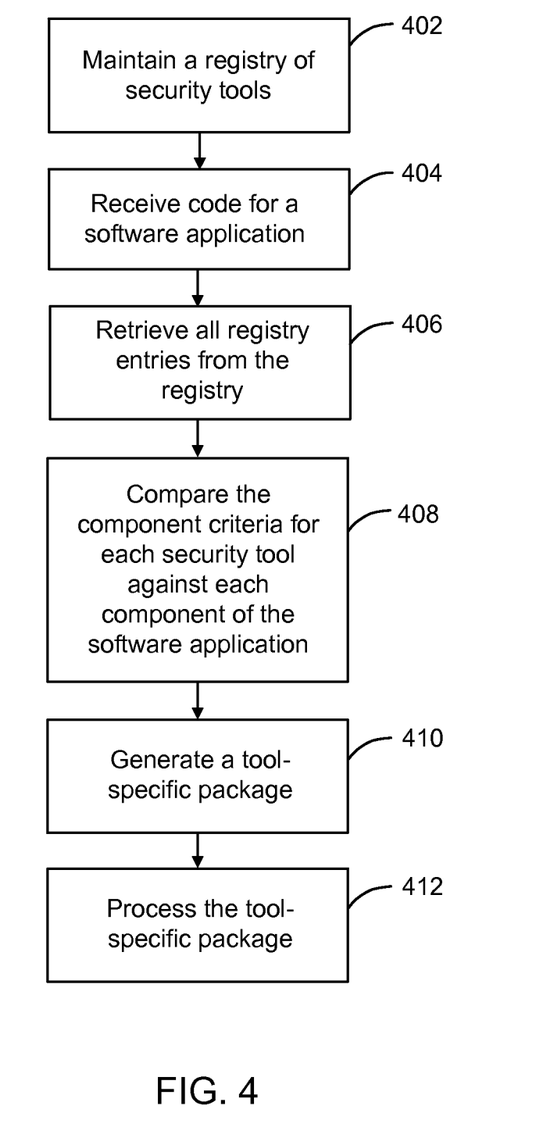
FIG. 4 illustrates an example simplified flow diagram for adapting a security tool for performing security analysis on a software application.

Embodiments described below with respect to FIG. 4 provide a system and method for adapting a security tool used to perform security analysis on code for a software application. A security tool may be a security assessment tool used to assess security vulnerabilities in software applications based on the components of the application. Embodiments described herein match the components of a given software application to one or more appropriate security tools. Embodiments also determine when and how to use these security tools based on the components, as such security tools may be technology and language specific, because components of software applications may use different technologies and languages. Conventional security tools are technology and language specific, requiring a large package to be manually separated, along with human intervention to decide on the tools or techniques appropriate for a given software package. Embodiments described herein minimize if not eliminate the need for manual security assessments.

FIG. 4 shows is an example simplified flow diagram for adapting a security tool for performing security analysis on code for a software application. Referring to both FIGS. 2 and 4, the method is initiated in block 402, where system 116 maintains a registry of security tools. In one embodiment, the registry includes multiple registry entries, each of which is associated with a different security tool. Each security tool is used to assess security vulnerabilities for particular type of software component. In one embodiment, the phrase "security tool" may be used to represent one or more tools, methodologies, and techniques to assess security vulnerabilities for particular type of software component. While system 116 is described as performing the steps as described in the embodiments herein, any suitable component or combination of components of system 116 or any worker machine or combination of worker machines may perform the steps described. For example, the steps may be performed by processor system 117 or process space 128 of FIG. 1, by system process 202 of FIG. 2, or by any other suitable processor or processors associated with system 116.

In one embodiment, each registry entry is associated with a particular security tool and is associated with software component criteria. In one embodiment, the software component criteria include a listing of components that that a particular security tool is designed to analyze for security vulnerabilities. In one embodiment, different software packages have different software components that use different technologies and languages. For example, in one embodiment, the listing of software components may contain file extensions, programming language, application design category (e.g., web application, client server, etc.), application characteristics (e.g., database-backed, clustered, etc.), regular expressions, application behaviors (e.g., accepts data parameter, connects to other systems, requires user logins, etc.), and other characteristics and distinguishing features, etc.

In one embodiment, for a given type of software component, some security tools are more reliable and accurate than others. In one embodiment, the security tools may include port and network scanners, web application scanners, static analysis engines for different languages, virus scanners, and component-specific custom tools, test-specific custom tools, etc.

In one embodiment, each security tool analyzes a software component to identify any security vulnerabilities, which could compromise system 116. Each security tool detects different types of security vulnerabilities. Depending on type of code submitted, system 116 may send the software application to particular tool that will be more effective in identifying security vulnerabilities. For example, the network scanner is sometimes but not always used, depending on the architecture of the code. Because a network scanner may require a substantial amount of system resources, it is beneficial to selectively use the network scanner.

In block 404, system 116 receives code for a software application from a user. The user may submit the code in various ways. In one embodiment, the user may initiate an upload of the code for the software application. In this example, the user types code into system 116 (e.g., via input system 112C of FIG. 2), after which the code may be stored in a database such as system database 124, or any other suitable storage location. In one embodiment, the user may send software code for a software application via an email, where system 116 extracts the software code from the email. In one embodiment, the software application may already be stored in system 116 (e.g., in system database 124) and is updated by the user periodically (e.g., 2-3 times per week).

In block 406, system 116 retrieves all current registry entries from the registry to determine all available security tools and associated component criteria. In block 408, system 116 compares the component criteria for each security tool against each component of the software application. In one embodiment, the component criteria for each respective security tool indicate which software components the respective security tool is designed to analyze for security vulnerabilities. In one embodiment, the comparing step may utilize automated searches for programming method calls known to perform certain behaviors. For example, system 116 may compare a given component that is written in a given language (e.g., C++, COBAL, etc.) to the available security tools in order to match the component to one or more security tools designed to analyze code in the given language. In one embodiment, system 116 may compare a given component of a given size to the available security tools in order to match the component to one or more security tools designed to efficiently and/or quickly analyze code of the given size. In one embodiment, the comparing step may also utilize automated searches for file names, file extensions, regular expressions, package origin, package installation environment, or other tests against the software package, etc. In one embodiment, the comparing step can be augmented with developer or administrator contributed checklists that outline characteristics of the software package.

In block 410, for each security tool that matches at least one component criterion, system 116 generates a tool-specific package for each component of the software application, wherein the tool-specific package includes one or more security tools that are designed to analyze the respective component for security vulnerabilities.

In one embodiment, system 116 may access security history information associated with the application. For example, the security history information may include the name of the user, the company, if the user has submitted applications in the past, what the user has done regarding security, and what the user may know about security vulnerabilities. For example, system 116 may require the user to take a quiz of a predetermined number of questions (e.g., 5-30 questions) in order to assess the user's knowledge of security (e.g., web application security). In one embodiment, system 116 may already have information about the user and company, before determining which tools to send it to.

In one embodiment, the tool-specific package may be based on a combination of the software components of the application and the security history information.

In block 412, system 116 processes the tool-specific package. In one embodiment, the processing may include analysis of the security tool. In one embodiment the processing may include configuration of one or more security tools (e.g., fine tuning the security tool) to more accurately and reliably identify security vulnerabilities in the one or more corresponding software components. In one embodiment, system 116 determines when to run each security tool in the tool-specific package (in 20 minutes, in 2 weeks, etc.).

In one embodiment, system 116 analyzes the software application to identify security vulnerabilities using the tool-specific package. In one embodiment, the assessment engine configures the tool-specific package to run against the software application in the necessary configuration or at the specified location.

A record of each tool used for the software application is saved and maintained. After all security tools have been completed, the individual reports are gathered from their respective tool repositories. Reports may optionally be assembled into a single master report containing the results of each tool's security analysis. In one embodiment, the results of each tool are used to derive a numeric risk score that is incorporated into an overall risk score. The design and function of the software package are used to weight the individual risk scores according to the expected quality of their results as well as their relevance of the tools area of assessment.

In one embodiment, if the one or more security vulnerabilities are identified by a security tool, system 116 may notify the user so that the user may address the security vulnerabilities. In one embodiment, system 116 may provide one or more fixes, people to contact for help, as well as libraries of code for appropriate modifications to the application.

Embodiments described herein provide numerous benefits. For example, the embodiments provide a scalable program to assess the security of thousands of the third-party applications that are constantly being generated and updated, without impacting the innovativeness and time-to-market of these third-parties. Embodiments eliminate the need to manually look through applications for security vulnerabilities, which enables security analysis performed by the system to keep pace with new application submissions and revisions of existing packages.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for performing security analysis on a software application, the method comprising:
   receiving application architecture information for a software application;
   determining components of the software application;
   determining a software application type to be at least one of a composite software application type and a native software application type based on the application architecture information;
   generating a tool-specific package for each of the components based on the software application type;
   performing, by a computer processor, one or more security tests on each of the components of the software application based on the tool-specific packages;
   approving the software application to be available in an online marketplace if the software application passes the one or more security tests; and
   providing results to a user if the software application fails the one or more security tests.

2. The method of claim 1, further comprising generating a risk score based on the application architecture information.

3. The method of claim 1, further comprising generating a risk score if the software application type is a composite application, wherein the risk score is based on the application architecture information.

4. The method of claim 1, further comprising providing results to a user if the software application fails the one or more security tests.

5. The method of claim 1, further comprising providing results to a user if the software application fails the one or more security tests, wherein the software application fails the one or more security tests if the one or more security tests identifies one or more security vulnerabilities.

6. The method of claim 1,
   wherein the software application fails the one or more security tests if the one or more security tests identifies one or more security vulnerabilities; and
   further comprising requiring the user to address the security vulnerability issues within a predefined time period.

7. A non-transitory computer-readable storage medium having one or more instructions thereon for performing security analysis on a software application, the instructions when executed by a processor causing the processor to:
- receive application architecture information for a software application;
- determine components of the software application;
- determine a software application type to be at least one of a composite software application type and a native software application type based on the application architecture information;
- generate a tool-specific package for each of the components based on the software application type;
- perform one or more security tests on each of the components of the software application based on the tool-specific packages;
- approve the software application to be available in an online marketplace if the software application passes the one or more security tests; and
- provide results to a user if the software application fails the one or more security tests.

8. The computer-readable storage medium of claim 7, wherein the instructions further cause the processor to generate a risk score based on the application architecture information.

9. The computer-readable storage medium of claim 7, wherein the instructions further cause the processor to generate a risk score if the software application type is a composite application, and wherein the risk score is based on the application architecture information.

10. The computer-readable storage medium of claim 7, wherein the instructions further cause the processor to provide results to a user if the software application fails the one or more security tests.

11. The computer-readable storage medium of claim 7, wherein the instructions further cause the processor to provide results to a user if the software application fails the one or more security tests, and wherein the software application fails the one or more security tests if the one or more security tests identifies one or more security vulnerabilities.

12. The computer-readable storage medium of claim 7,
- wherein the software application fails the one or more security tests if the one or more security tests identifies one or more security vulnerabilities; and
- wherein the instructions further cause the processor to:
  - require the user to address the security vulnerability issues within a predefined time period.

13. An apparatus for performing security analysis on a software application, the apparatus comprising:
- a processor; and
- a storage device storing one or more stored sequences of instructions which when executed by the processor cause the processor to:
  - receive application architecture information for a software application;
  - determine components of the software application;
  - determine a software application type to be at least one of a composite software application type and a native software application type based on the application architecture information;
  - generate a tool-specific package for each of the components based on the software application type;
  - perform one or more security tests on each of the components of the software application based on the tool-specific packages;
  - approve the software application to be available in an online marketplace if the software application passes the one or more security tests; and
  - provide results to a user if the software application fails the one or more security tests.

14. The apparatus of claim 13, wherein the instructions further cause the processor to generate a risk score based on the application architecture information.

15. The apparatus of claim 13, wherein the instructions further cause the processor to generate a risk score if the software application type is a composite application, and wherein the risk score is based on the application architecture information.

16. The apparatus of claim 13, wherein the instructions further cause the processor to provide results to a user if the software application fails the one or more security tests.

17. The apparatus of claim 13, wherein the instructions further cause the processor to provide results to a user if the software application fails the one or more security tests, and wherein the software application fails the one or more security tests if the one or more security tests identifies one or more security vulnerabilities.

* * * * *